(12) United States Patent
Sasaki

(10) Patent No.: US 12,111,156 B2
(45) Date of Patent: Oct. 8, 2024

(54) TARGET DEVICE AND SURVEYING SYSTEM

(71) Applicant: Topcon Corporation, Tokyo (JP)

(72) Inventor: You Sasaki, Tokyo (JP)

(73) Assignee: Topcon Corporation, Tokyo (JP)

( * ) Notice: Subject to any disclaimer, the term of this patent is extended or adjusted under 35 U.S.C. 154(b) by 1009 days.

(21) Appl. No.: 16/982,837

(22) PCT Filed: Mar. 25, 2019

(86) PCT No.: PCT/JP2019/012457
§ 371 (c)(1),
(2) Date: Sep. 21, 2020

(87) PCT Pub. No.: WO2019/188961
PCT Pub. Date: Oct. 3, 2019

(65) Prior Publication Data
US 2021/0055103 A1    Feb. 25, 2021

(30) Foreign Application Priority Data

Mar. 26, 2018  (JP) ................................. 2018-058028

(51) Int. Cl.
*G01C 15/00*    (2006.01)
*G01C 15/06*    (2006.01)
(Continued)

(52) U.S. Cl.
CPC .......... *G01C 15/002* (2013.01); *G01C 15/06* (2013.01); *G01S 17/42* (2013.01); *G01S 17/66* (2013.01)

(58) Field of Classification Search
CPC .... G01C 15/002; G01C 15/06; G01C 15/006; G01C 15/00; G01S 17/42; G01S 17/66
See application file for complete search history.

(56) References Cited

U.S. PATENT DOCUMENTS 7,913,405 B2 *  3/2011  Berg ...................... G01C 15/06
                                                              33/228
9,073,637 B2 *  7/2015  Ohtomo ................. G05D 1/106
(Continued)

FOREIGN PATENT DOCUMENTS

CN          104142122 A      11/2014
CN          207850369 U       9/2018
(Continued)

OTHER PUBLICATIONS

International Search Report and Written Opinion mailed in connection with International Patent Application No. PCT/JP2019/012457, filed Mar. 25, 2019, 9 pgs (including translation).

*Primary Examiner* — Yaritza Guadalupe-McCall
(74) *Attorney, Agent, or Firm* — Chiesa Shahinian & Giantomasi PC

(57) ABSTRACT

A target device 20 includes: a prism 22 configured to reflect light incident on the prism in a direction identical to a direction of incidence of the light; a support part 21 configured to support the prism 22; and a plurality of direction indicators 23 formed on the prism 22 to indicate a direction of the prism. A surveying system 1 includes the target device 20 attached to a camera 11 of a UAV 10, and a surveying device 3 surveying the prism 22 as a target and taking a target image Tp including the prism 22 to detect the orientation of the UAV 10 based on the direction indicators 23 appearing in the target image.

8 Claims, 7 Drawing Sheets

(51) Int. Cl.
  *G01S 17/42*  (2006.01)
  *G01S 17/66*  (2006.01)

(56) References Cited

U.S. PATENT DOCUMENTS

| | | | | |
|---|---|---|---|---|
| 10,324,183 | B2* | 6/2019 | Ohtomo | G01S 7/4808 |
| 10,565,730 | B2* | 2/2020 | Sasaki | G01C 11/08 |
| 11,221,216 | B2* | 1/2022 | Sasaki | B64F 1/36 |
| 11,460,299 | B2* | 10/2022 | Nishita | G01C 11/02 |
| 2009/0235541 | A1 | 9/2009 | Kumagai et al. | |
| 2012/0078451 | A1 | 3/2012 | Ohtomo et al. | |
| 2014/0240498 | A1* | 8/2014 | Ohtomo | G05D 1/0094 |
| | | | | 348/144 |
| 2014/0343890 | A1* | 11/2014 | Lettau | G01S 17/86 |
| | | | | 702/150 |
| 2018/0210164 | A1 | 7/2018 | Haijima et al. | |
| 2019/0073794 | A1* | 3/2019 | Sasaki | G06T 7/75 |
| 2019/0234733 | A1* | 8/2019 | Nishita | G01C 3/02 |
| 2021/0055103 | A1* | 2/2021 | Sasaki | G01C 15/002 |
| 2021/0131804 | A1* | 5/2021 | Sasaki | G01C 15/00 |
| 2022/0026208 | A1* | 1/2022 | Ito | G05D 1/101 |
| 2023/0083021 | A1* | 3/2023 | Sasaki | G01C 15/002 |
| | | | | 701/300 |

FOREIGN PATENT DOCUMENTS

| | | | | |
|---|---|---|---|---|
| EP | 2433867 A2 | 3/2012 | | |
| EP | 2801839 A1 | 11/2014 | | |
| EP | 3088838 A1 | 11/2016 | | |
| JP | S60-80707 A | 5/1985 | | |
| JP | 2009229192 A | 10/2009 | | |
| JP | 2012071645 A | * 4/2012 | ........... | B64C 39/024 |
| JP | 2016017931 A | * 2/2016 | | |
| JP | 2016205909 A | * 12/2016 | ............ | B61D 17/04 |
| JP | 2018-119882 A | 8/2018 | | |
| JP | 2019-074386 A | 5/2019 | | |

* cited by examiner

TARGET DEVICE AND SURVEYING SYSTEM

CROSS-REFERENCE TO RELATED APPLICATIONS

This application is a national stage under 35 U.S.C. § 371 of International Patent Application No. PCT/JP2019/012457, filed Mar. 25, 2019, which claims priority to Japanese Patent Application No. 2018-058028, filed Mar. 26, 2018, the disclosures of both are incorporated herein by reference in their entirety.

TECHNICAL FIELD

The present disclosure relates to a technique for a target device to be surveyed using a surveying device, and a surveying system including the target device.

BACKGROUND ART

A target device including a rod-like member provided with a reflecting prism is used for a survey with a total station (hereinafter referred to as the "TS") serving as a surveying device (see, for example, Patent Document 1). In the survey using the target device, the reflecting prism is positioned with the TS while the tip of the upright rod-like member is bought into contact with the ground. In this manner, the coordinate of the location at which the tip of the rod-like member is brought into contact with the ground is acquired. This operation performed at various points on a target piece of land allows the target piece of land to be surveyed.

In the foregoing operation, an operator holds the target device in his/her hand, and conducts a survey at a plurality of locations while walking. During this operation, the operator is guided from the TS to the next survey location using a terminal or any other similar device held by the operator. In this case, it is convenient to determine the horizontal angle (the direction in the horizontal plane) of the target device with respect to the TS. Normally, the horizontal angle described above is detected using a magnetic sensor or a gyroscope. In addition, a technique in which directions are detected using a global positioning system (GPS) has also been known.

CITATION LIST

Patent Document

Patent Document 1: Japanese Unexamined Patent Publication No. 2009-229192

SUMMARY OF THE INVENTION

Technical Problem

The detection of the horizontal angle with the magnetic sensor is affected by a metal structure. This detection is affected by reinforcing bars or steel frames in concrete near a bridge, for example. Examples of techniques for reinforcing the ground include a technique in which a corrugated steel material is driven into the ground. However, the accuracy of the magnetic sensor may decrease under the influence of the steel material in the ground. In addition, the output of the gyroscope may drift unfortunately. Gyroscopes that have solved this problem are also provided. However, such gyroscopes are expensive and large. GPSs cannot be used at places that are invisible from navigation satellites (valleys, under bridges, the interiors of tunnels, indoors, underground, forest, and other similar places).

The problems described above occur also if the orientation of an unmanned aerial vehicle (UAV) with respect to the TS is to be determined. For example, determining the orientation of the UAV with the TS enables efficient overlapping photography for photographic surveying. However, detecting the orientation using the direction sensor, the gyroscope, and the GPS causes problems similar to those described above.

An embodiment of the present disclosure has been made to solve the above-described problems, and it is therefore an object of the embodiment of the present disclosure to provide a target device and a surveying system which have a simple configuration and which allow the orientation of the target device to be detected.

Solution to the Problem

In order to achieve the foregoing object, a target device according to an embodiment of the present disclosure is a target device to be surveyed. The target device includes: a reflector configured to reflect light incident on the reflector in a direction identical to a direction of incidence of the light; a support part configured to support the reflector; and a plurality of direction indicators formed on the reflector or the support part to indicate a direction of the reflector.

In the ranging target device described above, the direction indicators may be distinguished from each other based on appearances of the direction indicators to indicate the direction of the reflector.

In the ranging target device described above, the reflector may be a polyhedron prism, and the direction indicators may respectively correspond to side surfaces of the prism.

In the ranging target device described above, the reflector may be a polyhedron prism, and the direction indicators may be respectively formed on apexes of the prism.

In order to achieve the foregoing object, a surveying system according to another embodiment of the present disclosure is a surveying system for surveying the target device. The surveying system includes: a surveying instrument configured to collimate the reflector of the target device to survey a location of the reflector; a target imager oriented in a direction identical to a direction of collimation of the surveying instrument, the target imager being configured to take a target image including the reflector; and an orientation detector configured to detect an orientation of the target device based on the direction indicators appearing in the target image.

In the surveying system described above, the target device may be provided on a mobile object, and the orientation detector may detect an orientation of the mobile object based on the orientation of the target device.

In the surveying system described above, the mobile object may be a flight vehicle, and the surveying system may further include: a camera mounted on the flight vehicle to take an image for a photographic survey; and a surveying controller configured to add information on the orientation of the mobile object detected by the orientation detector to a surveying result surveyed by the surveying instrument, and to associate the surveying result with the image taken by the camera to generate data for the photographic survey.

Advantages of the Invention

According to an embodiment of the present disclosure including the solution described above, a simple configuration allows the orientation of a target device to be detected.

Figure 6:
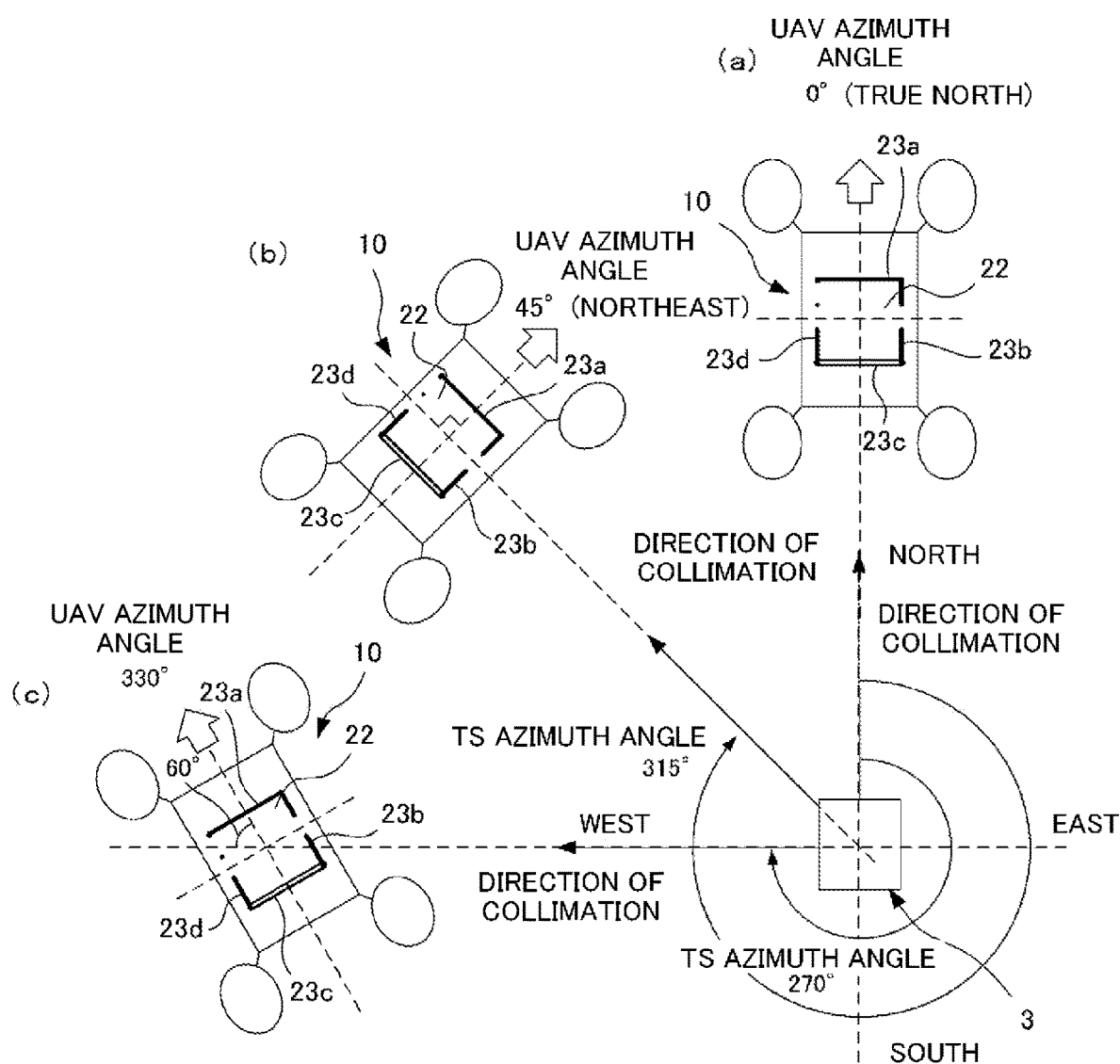

Portions (a) to (c) of FIG. 6 respectively illustrate the azimuth angles of the UAV.

DESCRIPTION OF EMBODIMENTS

Embodiments of the present disclosure will now be described with reference to the drawings.

Figure 1:
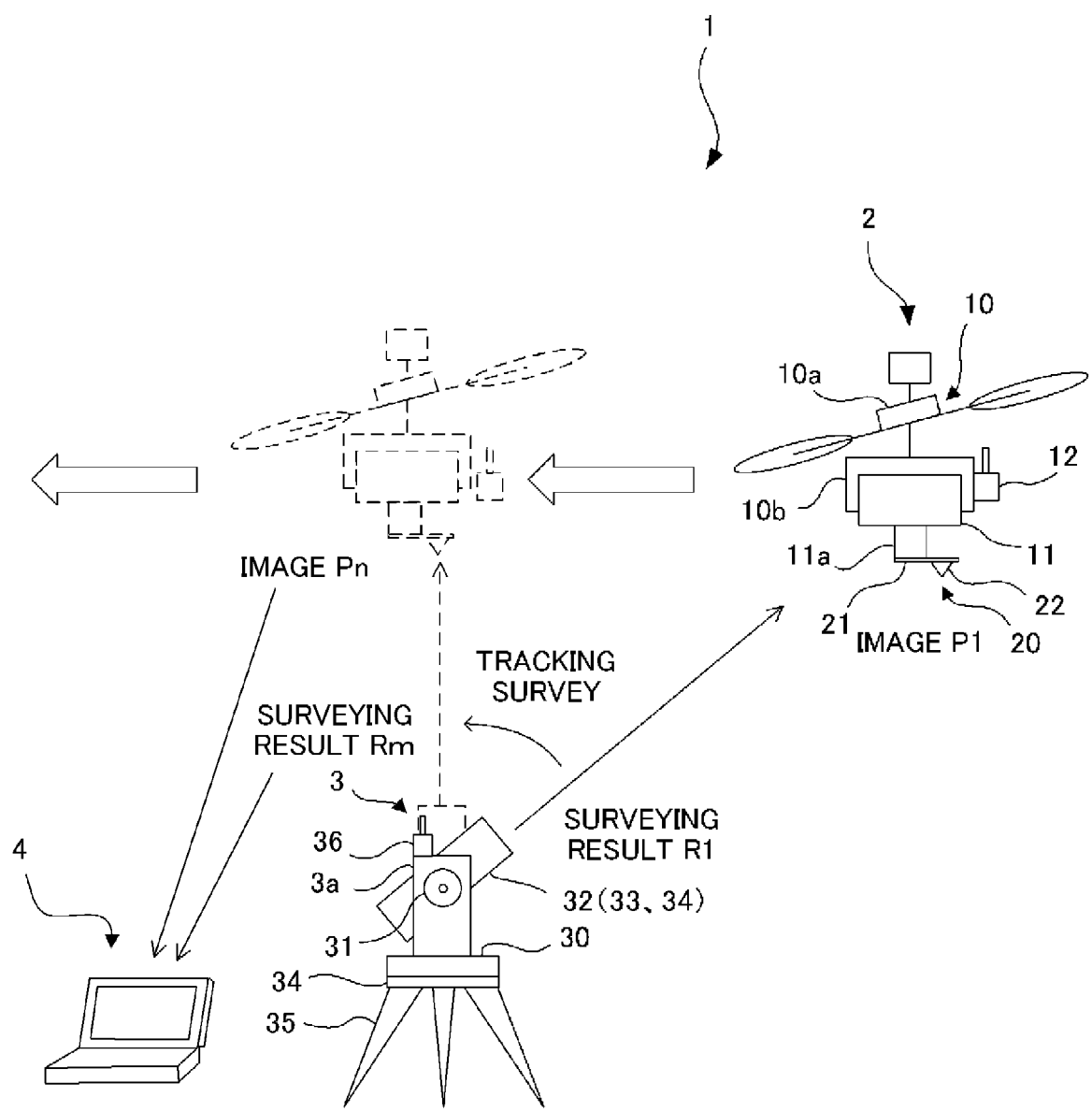
FIG. 1 illustrates an overall configuration of a surveying system including a target device according to an embodiment of the present disclosure.
Figure 2A:
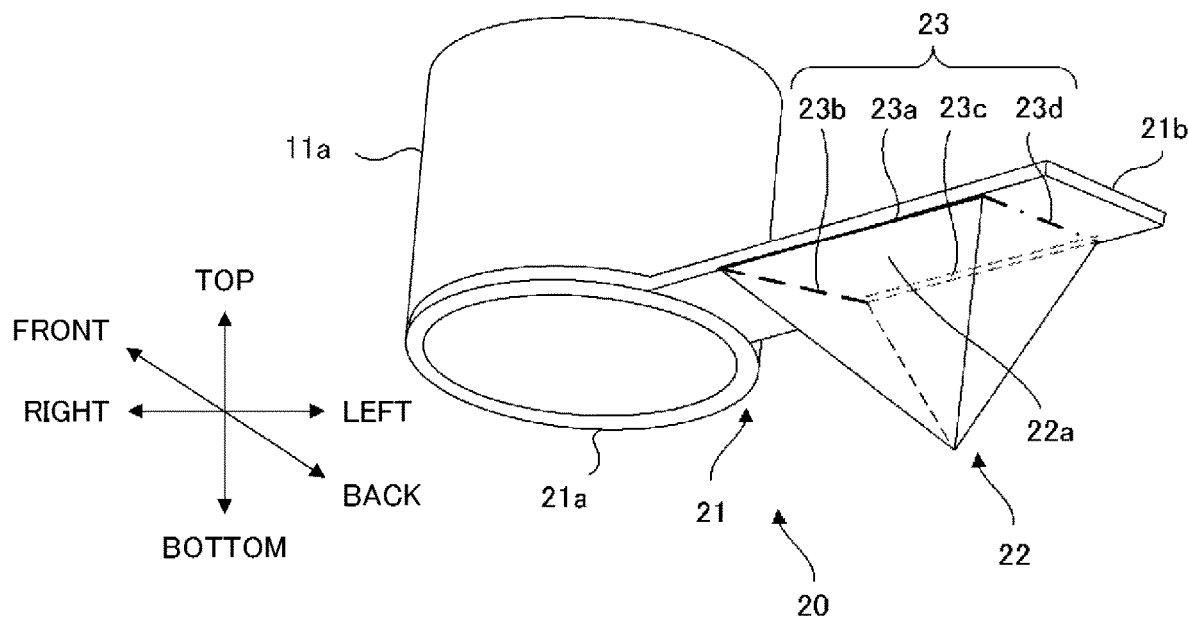
FIG. 2A is a perspective view of the target device.
Figure 2B:
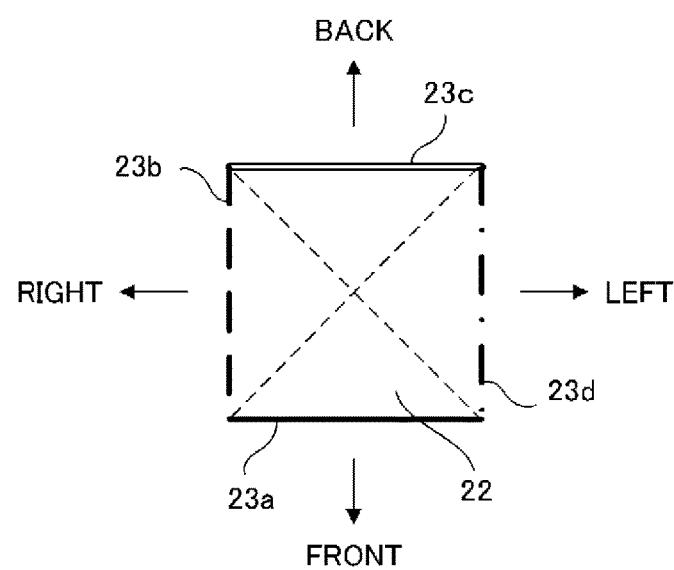
FIG. 2B is a simplified top view of a prism of the target device.

FIG. 1 illustrates an overall configuration of a surveying system including a target device according to an embodiment of the present disclosure. FIG. 2A is a perspective view of the target device. FIG. 2B is a simplified top view of a prism of the target device. Configurations of the target device and the surveying system according to the embodiment of the present disclosure will be described with reference to FIGS. 1, 2A, and 2B.

A surveying system 1 is a surveying system for conducting a photographic survey, and includes a movable imaging device 2, a surveying device 3, and an analyzing device 4. The movable imaging device 2 takes images for a photographic survey while moving. The surveying device 3 surveys the location and orientation of the movable imaging device 2. The analyzing device 4 analyzes an imaging result and an associated surveying result to generate data for the photographic survey.

The movable imaging device 2 includes a UAV 10 serving as a mobile object, and a camera 11 mounted on the UAV 10 to take images for a photographic survey. Note that the images taken by the camera 11 may be still images or moving images.

More specifically, the UAV 10 is a flying vehicle capable of flying along a predetermined flight path and flying freely under remote control. The UAV 10 includes a gimbal mechanism 10b provided on a lower portion of a flight mechanism 10a for flying.

The camera 11 is supported by the gimbal mechanism 10b of the UAV 10. The gimbal mechanism 10b can freely change the direction of imaging, and can stabilize the orientation of the camera to take an image in a predetermined direction. In this embodiment, the camera 11 is always directed downward, and is supported so as to be integrated with the UAV 10 when the UAV 10 is horizontally oriented.

The camera 11 is provided with a GPS unit 12 capable of receiving a GPS signal. The camera 11 further has a lens part 11a which is formed on the front surface of the camera body, and which is provided with a target device 20.

As specifically shown in FIG. 2A, the target device 20 has a support member 21 (support part) attached to a front end of the lens part 11a of the camera 11, and a prism 22 (reflector) supported by the support member 21.

The support member 21 has an annular portion 21a having a diameter in conformity with the diameter of the lens part 11a, and fitted to the front end of the lens part 11a, and a plate-like portion 21b configured as a flat plate extending outward from the annular portion 21a.

The prism 22 of this embodiment includes four corner cube prisms each configured as a tetrahedron and combined together, and forms a regular quadrangular pyramid having a square bottom surface. The prism 22 is a so-called omnidirectional reflector that reflects light incident on each of four side surfaces of the prism 22 except the bottom surface 22a in a direction identical to the direction of incidence of the light. The prism 22 has its bottom surface 22a bonded to a surface of the plate-like portion 21b of the support member 21. Thus, the prism 22 protrudes beyond the front end surface of the lens part 11a, and can receive ranging light without being blocked by the lens part 11a.

As shown in FIGS. 2A and 2B, direction indicators 23a, 23b, 23c, and 23d (collectively referred to also as the "direction indicators 23") are respectively formed on the four sides of the bottom surface 22a of the prism 22. The direction indicators 23a, 23b, 23c, and 23d respectively correspond to the side surfaces of the prism 22, have different colors, and thus indicate the direction of the prism. In the drawings, the colors of the direction indicators 23 are indicated by different types of lines. For example, the first direction indicator 23a having a red color is indicated by the bold line, the second direction indicator 23b having a blue color is indicated by the bold dotted line, the third direction indicator 23c having a yellow color is indicated by the double line, and the fourth direction indicator 23d having a green color is indicated by the bold chain line.

The target device 20 has its prism 22 provided with the four types of direction indicators 23 as described above. Thus, the orientation of the target device 20, i.e., the orientation of the movable imaging device 2 including the camera 11 and the UAV 10 both integrated with the target device 20 can be recognized. For example, the target device 20 of this embodiment has its prism 22 arranged such that the first, second, third, and fourth direction indicators 23a, 23b, 23c, and 23d respectively correspond to the front side (direction of travel), right side, back side, and left side of the UAV 10.

Referring back to FIG. 1, the surveying device 3 is a total station capable of automatically tracking a survey target, and has a body 3a, a horizontal rotator 30, a vertical rotator 31, and a telescope 32 equipped via the vertical rotator 31, the horizontal rotator 30 that is rotatable in a horizontal direction and the vertical rotator 31 that is rotatable in a vertical direction being interposed between the body 3a and the telescope 32. The telescope 32 includes an electro-optical distance meter (EDM) 33 (surveying instrument) and a target imager 34. The EDM 33 sends and receives ranging light to and from the target device 20 (strictly speaking, the prism 22) to measure the slope distance. The target imager 34 takes an image of the target device 20. Further, the surveying device 3 is placed on a tripod 35. The surveying device 3 also includes a GPS unit 36.

Specifically, the surveying device 3 is capable of measuring the distance (ranging) and horizontal and vertical angles from the surveying device 3 to the prism 22 by prism surveying using the prism 22 of the target device 20 as a survey target. Thus, if the surveying device 3 is placed at a known location, and is leveled to survey the prism 22, the coordinate of the prism 22, i.e., the location of the camera 11, can be calculated based on the surveying results (the slope distance, and the horizontal and vertical angles). The target imager 34 is oriented in the same direction as the direction of collimation of the surveying device 3 via the telescope 32, and functions to take an image visible through the telescope 32, as will be described in detail below.

The analyzing device 4 is an information processing terminal, such as a personal computer, capable of generating data for a photographic survey by associating surveying results obtained by the surveying device 3 with the location at which an associated one of images is taken by the movable imaging device 2.

As shown in FIG. 1, the surveying system 1 uses the movable imaging device 2 to take a plurality of images P1, P2, . . . , Pn for a photographic survey at a predetermined imaging period ΔS while moving through the sky, and uses the surveying device 3 to track, and survey, the movable imaging device 2 (strictly speaking, the prism 22). After all necessary images have been taken, the analyzing device 4 associates the images P1, P2, . . . , Pn taken by the movable imaging device 2 with the surveying results R1, R2, . . . , Rm obtained by surveying with the surveying device 3, thereby generating data for the photographic survey.

The surveying system 1 of this embodiment associates the images P1 to Pn with the surveying results R1 to Rm based on the GPS time that can be obtained through a GPS (satellite positioning system) satellite using the GPS unit 12 of the movable imaging device 2 and the GPS unit 36 of the surveying device 3. That is to say, every time the movable imaging device 2 takes an image, the movable imaging device 2 adds information on the image-taking time based on the GPS time to the image. On the other hand, every time the surveying device 3 surveys the location of the movable imaging device 2, the surveying device 3 adds information on the surveying time based on the GPS time to the surveying results. Then, after all necessary images have been taken, the analyzing device 4, based on the surveying time matched to the time each image was taken, associates a precise surveying result surveyed by the surveying device 3 with the location at which the image was taken. The analyzing device 4 performs calculation based on a photographic survey from images (data for the photographic survey) each including such a location at which the image was taken.

Further, in the surveying system 1 of this embodiment, the surveying device 3 can control a tracking survey of the movable imaging device 2 and detect the orientation of the movable imaging device 2 based on the direction indicators 23 attached to the prism 22.

Figure 3:
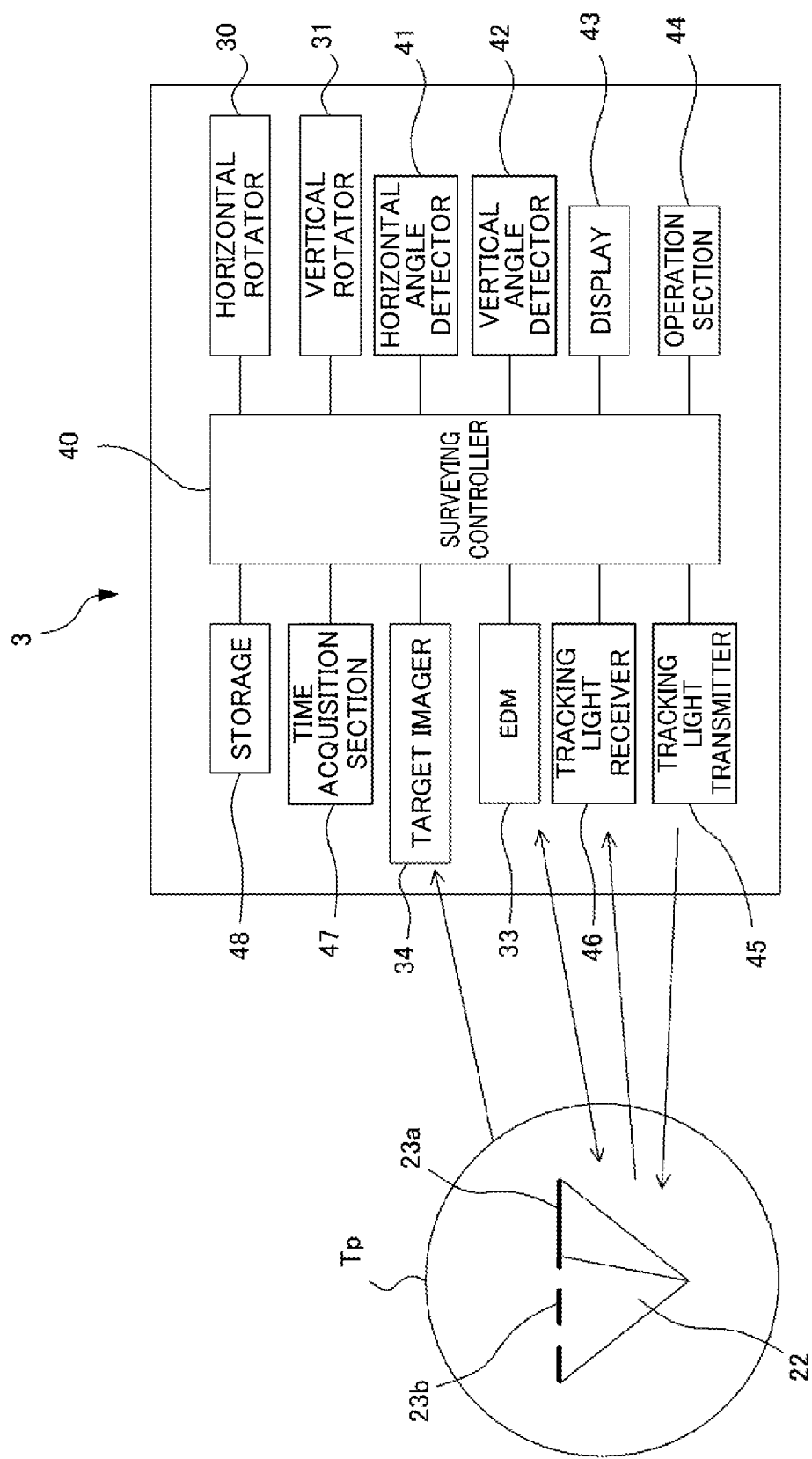
FIG. 3 is a block diagram of a control system of the surveying system according to the embodiment of the present disclosure.

How such a surveying device 3 is controlled is specifically shown in FIG. 3, which is a block diagram of a control system for the surveying system 1. The configuration of the control system for the surveying system 1 will be described with reference to FIG. 3.

As shown in FIG. 3, the surveying device 3 includes a surveying controller 40 connected to a horizontal angle detector 41 (surveying instrument), a vertical angle detector 42 (surveying instrument), a display 43, an operation section 44, a tracking light transmitter 45, a tracking light receiver 46, a time acquisition section 47, and a storage 48 in addition to the horizontal rotator 30, the vertical rotator 31, the EDM 33, and the target imager 34 all described above.

The horizontal angle detector 41 can detect a horizontal angle of rotation of the horizontal rotator 30 to detect a horizontal angle at which the telescope 32 is collimated. The vertical angle detector 42 can detect a vertical angle of rotation of the vertical rotator 31 to detect a vertical angle at which the telescope 32 is collimated. The horizontal and vertical angle detectors 41 and 42 detect the horizontal and vertical angles as surveying results.

The display 43 is, for example, a liquid crystal monitor, and displays various kinds of information, such as the surveying results (the distance and the horizontal and vertical angles).

The operation section 44 is an operating means through which various motion instructions and settings are entered into the surveying controller 40, and examples of the motion instructions and settings include on/off switching for a power supply, triggering the start of a survey, switching among surveying modes, and setting the surveying period.

The tracking light transmitter 45 irradiates the prism 22 of the target device 20 of the movable imaging device 2 with tracking light. The tracking light receiver 46 receives the tracking light reflected by the prism 22. The surveying controller 40 controls the horizontal and vertical rotators 30 and 31 so that the tracking light receiver 46 continues to receive the tracking light from the tracking light transmitter 45. Thus, the target device 20 can be tracked by the surveying controller 40.

The target imager 34 is capable of taking an image via the telescope 32, and includes a shutter and an imaging element that converts an optical image into an electric signal, such as a charge-coupled device (CCD) or a complementary metal oxide semiconductor (CMOS) element. The target imager 34 takes a target image including the prism 22 on which the telescope is collimated. Data on the taken image is stored in the storage 48 described below. The target image Tp may be a still image or a moving image. However, the target imager 34 according to this embodiment takes a still image at the same time as surveying.

The time acquisition section 47 functions to receive a GPS signal including time information (hereinafter referred to as the "GPS time") from a GPS satellite using the GPS unit 36 to acquire the GPS time.

The storage 48 can store a program for the above tracking, various kinds of programs relating to a surveying method, and various data, such as the type and features of the target device, data obtained by surveying, the GPS time, and data on the images taken by the target imager 34.

The surveying controller 40 instructs the surveying instruments (the EDM 33, the horizontal angle detector 41, and the vertical angle detector 42) to acquire data obtained by surveying (the distance, and the horizontal and vertical angles) and other kinds of information while tracking the prism 22 of the target device 20, and to add the GPS time (surveying time information) acquired by the time acquisition section 47 to the surveying results.

Further, the surveying controller 40 instructs the target imager 34 to take an image at the same timing as the surveying described above, and instructs the storage 48 to store the taken target image Tp. Note that the target images shown in the drawings show only the prism 22 for simplification.

The surveying controller 40 also functions as an orientation detector that detects the orientation of the prism 22, that is, the orientation (direction) of the camera 11 and the UAV 10 during surveying, based on how the direction indicators 23 appear in the target image Tp stored in the storage 48.

Specifically, referring to FIGS. 4 to 6, FIG. 4A shows the positional relationship between a surveying device and a UAV in a situation where a direction of collimation of the surveying device is identical to the direction of travel of the UAV. FIG. 4B shows an example of a target image in the situation where the direction of collimation of the surveying device is identical to the direction of travel of the UAV. FIG. 5A shows the positional relationship between the surveying device and the UAV in a situation where the direction of travel of the UAV forms an angle of 60° with respect to the surveying device. FIG. 5B shows the relationship between a target image and direction indicators in the situation where the direction of travel of the UAV forms an angle of 60° with respect to the surveying device. Portions (a) to (c) of FIG. 6 respectively illustrate the azimuth angles of the UAV. How the orientation of the UAV 10 is detected based on the target image Tp will now be described with reference to these figures. FIGS. 4A to 6 show the prism 22 on a larger scale than, and at the center of, the UAV 10 for easy understanding. In the description of this embodiment, the direction of collimation of the surveying device 3 is used as a reference in a horizontal plane, and an angle from the direction of collimation in the clockwise direction is used as a positive angle.

Figure 4A:
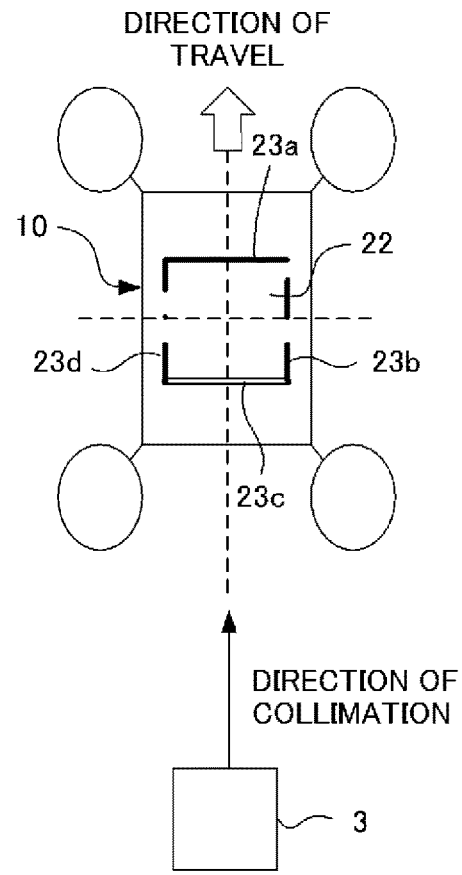
FIG. 4A shows the positional relationship between a surveying device and a UAV in a situation where a direction of collimation of the surveying device is identical to the direction of travel of the UAV.
Figure 4B:
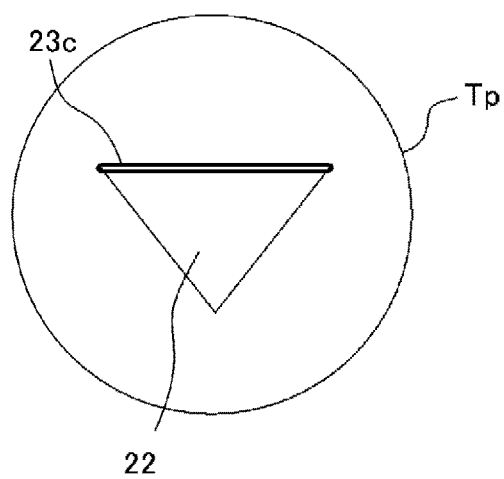
FIG. 4B shows an example of a target image in the situation where the direction of collimation of the surveying device is identical to the direction of travel of the UAV.

While the direction of collimation of the surveying device 3 and the direction of travel of the UAV 10 are identical as shown in FIG. 4A, only the third direction indicator 23c corresponding to the back surface of the UAV 10 appears in the target image Tp as shown in FIG. 4B. In such a case, the surveying controller 40 detects the angle of rotation of the movable imaging device 2 (hereinafter referred to as the "UAV rotation angle") with respect to the direction of collimation of the surveying device 3 as 0°.

Figure 5A:
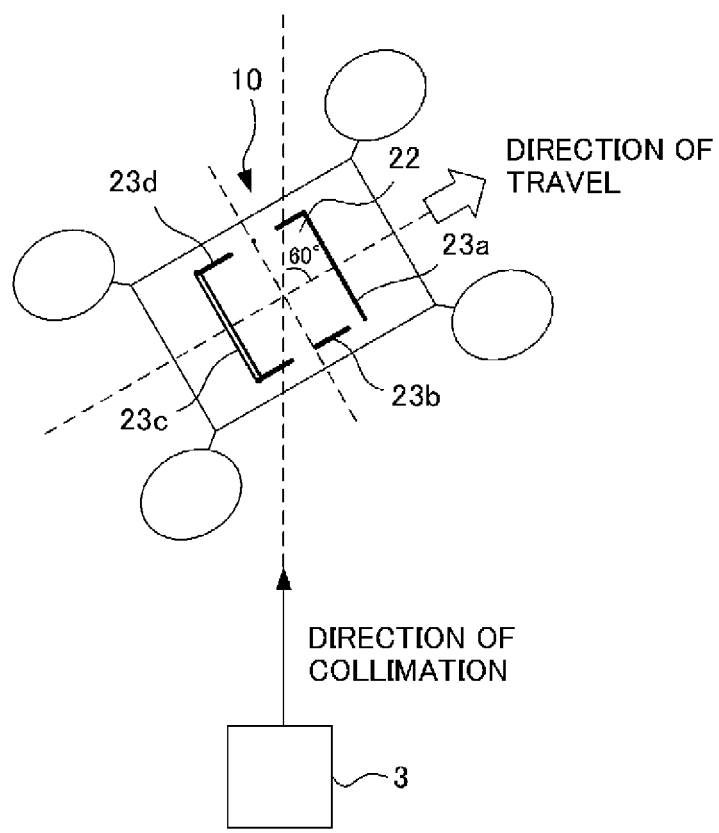
FIG. 5A shows the positional relationship between the surveying device and the UAV in a situation where the direction of travel of the UAV forms an angle of 60° with respect to the surveying device.
Figure 5B:
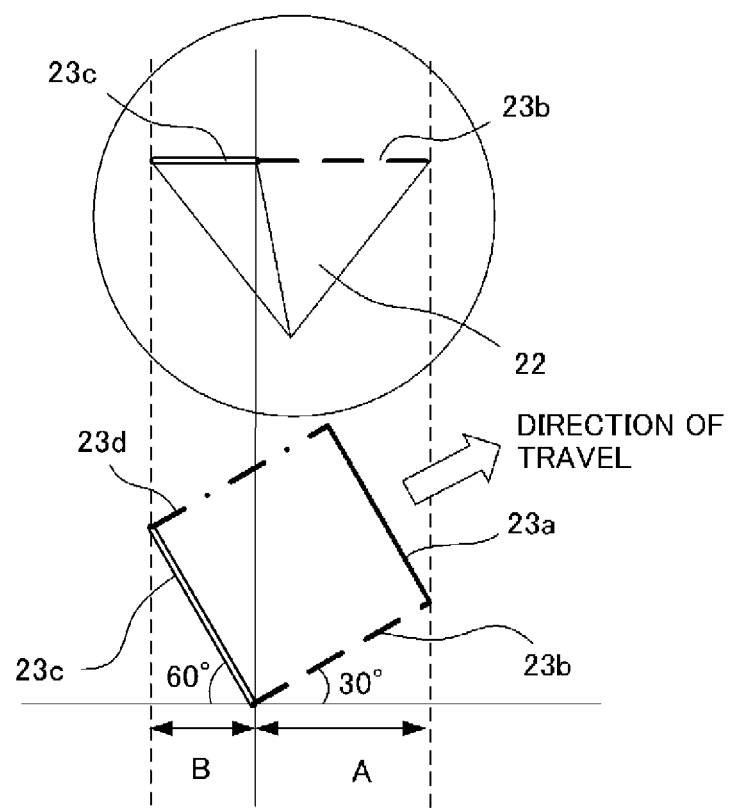
FIG. 5B shows the relationship between a target image and direction indicators in the situation where the direction of travel of the UAV forms an angle of 60° with respect to the surveying device.

While the direction of travel of the UAV 10 forms a clockwise angle of 60° from the direction of collimation of the surveying device 3 as shown in FIG. 5A, the second direction indicator 23b corresponding to the right side of the UAV and the third direction indicator 23c corresponding to the back surface of the UAV 10 appear in the target image Tp as shown in FIG. 5B. In such a case, the surveying controller 40 detects the orientation of the UAV 10 based on the ratio at which the second and third direction indicators 23b and 23c appear.

For example, if the bottom surface 22a of the prism 22 has a side length x of 10 cm, and the UAV rotation angle θ is equal to 60°, the apparent length A of the second direction indicator 23b and the apparent length B of the third direction indicator 23c are respectively defined by the following formulae (1) and (2) as shown in FIG. 5B. In other words, as indicated by the following formula (3), the UAV rotation angle θ can be calculated from the ratio between the apparent lengths A and B.

$$A = x \times \cos(90° - \theta) = 10 \times \cos(30°) = 8.66 \quad (1)$$

$$B = x \times \cos(\theta) = 10 \times \cos(60°) = 5.00 \quad (2)$$

$$\theta = \tan^{-1}(A/B) = \tan^{-1}(8.66/5.00) = 59.99 \quad (3)$$

As can be seen, the surveying controller 40 can detect the UAV rotation angle with respect to the surveying device 3 based on the ratio among the apparent lengths of the direction indicators 23 in the target image Tp. The surveying controller 40 can also detect the azimuth angle of the direction of travel of the UAV 10 (hereinafter referred to as the "UAV azimuth angle") using the UAV rotation angle and the surveying result (horizontal angle) detected by the horizontal angle detector 41.

For example, if, as shown in the portion (a) of FIG. 6, the azimuth angle of the direction of collimation of the surveying device 3 (hereinafter referred to as the "TS azimuth angle") detected by the horizontal angle detector 41 is 0°, and the UAV rotation angle is 0°, the UAV azimuth angle is 0° (=0°+0°), which indicates the true north.

If, as shown in the portion (b) of FIG. 6, the TS azimuth angle is 315°, and the UAV rotation angle is 90°, the UAV azimuth angle is 45° (=315°+90°), which indicates the northeast. If, as shown in the portion (c) of FIG. 6, the TS azimuth angle is 270°, and the UAV rotation angle is 60°, the UAV azimuth angle is 330° (=270°+) 60°.

As can be seen, the surveying controller 40 can calculate the UAV azimuth angle through addition of the UAV rotation angle to the TS azimuth angle, and adds the calculated UAV azimuth angle as information on the orientation of the UAV 10 to the surveying results.

After the movable imaging device 2 has taken all necessary images, the analyzing device 4 acquires the surveying results including the UAV azimuth angle from the surveying device 3, and associates the surveying results with the images taken by the camera 11 of the movable imaging device 2 based on the GPS time. This allows the orientation of the image to be determined. Since the orientation of such an image can be determined, overlapping regions of the images taken during a photographic survey can be more accurately calculated. This can improve the accuracy of the photographic survey. In this embodiment, the surveying results are associated with the images after all necessary images have been taken. However, this is merely an example of the present disclosure. For example, during the flight of the movable imaging device 2, an operator of the UAV 10 or a controller of the UAV 10 may be notified of pieces of orientation information, such as the UAV azimuth angle calculated by the surveying device 3, one by one. As a result, the operator or the UAV 10 itself can appropriately correct the orientation of the UAV 10 (the movable imaging device 2) to satisfy the conditions on which the images taken during the photographic survey overlap each other. This can further improve the accuracy of the photographic survey.

The target device 20 capable of determining the orientations of the UAV 10 and the camera 11 as described above has a simple configuration in which the direction indicators 23 having different colors are merely respectively provided on the sides of the bottom surface 22a of the prism 22, and can detect the orientation of the target device 20.

In particular, the direction indicators 23 capable of being distinguished from one another based on their appearances such as colors allow the orientation of the target device 20 to be detected while this detection is less likely to be affected by the environment than detection of the horizontal angle with a magnetic sensor, a gyroscope, a GPS, or any other similar device.

The direction indicators 23 respectively corresponding to the sides of a regular quadrangular pyramid such as the prism 22 of this embodiment allow the orientation of the target device 20 to be easily detected based on the ratio among the apparent lengths of the direction indicators 23 in the target image Tp.

As can be seen, the target device and the surveying system according to the embodiment of the present disclosure have a simple configuration, and allow the orientation of the target device to be detected.

Thus, the embodiment of the present disclosure has been described hereinabove. However, the present disclosure is not limited to the embodiment described above.

In the foregoing embodiment, the direction indicators 23 are respectively formed on the sides of the bottom surface 22a of the prism 22. However, the direction indicators do not always have to be formed on the prism, but may be formed on a support part for the prism.

In the foregoing embodiment, the direction indicators 23 are distinguished from one another based on their colors. However, this is merely an example of the present disclosure. The direction indicators 23 may be distinguished from one another based on their other types of appearance, such as their respective bar codes, their respective patterns, their respective letters, colors and patterns of light emitted from their respective light emitters, such as LEDs.

In the foregoing embodiment, the direction indicators 23 are formed so as to respectively correspond to all the sides of the prism 22. However, the direction indicators 23 do not always have to respectively correspond to all the sides. For example, even if the first and third direction indicators 23a and 23c in the foregoing embodiment are eliminated, the front-back direction of the UAV 10 may be determined based on other pieces of the positional relationship information such as, the direction in which the support part extends relative to the prism. In other words, the number of direction indicators can be reduced based on information such as the relative location of the target device viewed from the surveying device.

The direction indicators do not have to be respectively formed on the sides of the prism, but may be respectively formed on the apexes of the prism. Thus, the direction indicators can be more simply formed.

The target device 20 according to the foregoing embodiment includes the quadrangular pyramid-shaped prism 22. However, this is merely an example of the present disclosure. The embodiment of the present disclosure is applicable also to a prism formed in the shape of any other polyhedron, such as a triangular pyramid or a regular octahedron.

In the foregoing embodiment, the movable imaging device 2 adopts the UAV 10 as a mobile object. However, the mobile object that move a rod-like member is not limited to this UAV, and may be, for example, a human, an automobile or a heavy machine. In other words, the target device according to the embodiment of the present disclosure is used not only for a surveying system for a photographic survey, but also for other surveying systems.

In the foregoing embodiment, the surveying controller 40 of the surveying device 3 functions also as an orientation detector. However, the analyzing device may include an orientation detector. Alternatively, the surveying device may function also as an analyzing device.

The surveying system of the foregoing embodiment brings the surveying results in synchronization with the taken image based on the GPS time. However, this process for bringing the surveying results in synchronization with the image is merely an example of the present disclosure.

1 Surveying System
2 Movable Imaging Device
3 Surveying Device
4 Analyzing Device
10 UAV
11 Camera
11a Lens Part
20 Target Device
21 Support Part
22 Prism (Reflector)
23 Direction Indicator
33 EDM
34 Target Imager
41 Horizontal Angle Detector
42 Vertical Angle Detector

The invention claimed is:

1. A target device to be surveyed, the device comprising:
a reflector configured to reflect light incident on the reflector in a direction identical to a direction of incidence of the light, wherein the reflector comprises a bottom surface with sides;
a support part configured to support the reflector; and
a direction indicator formed on each of the sides to indicate a direction of the reflector, wherein each of the direction indicators are distinguished from one another based on appearance, and wherein
the reflector is a polyhedron prism.

2. The target device of claim 1, wherein the bottom surface comprises four sides.

3. A target device to be surveyed, the device comprising:
a reflector configured to reflect light incident on the reflector in a direction identical to a direction of incidence of the light;
a support part configured to support the reflector; and
a plurality of direction indicators formed on the reflector or the support part to indicate a direction of the reflector, wherein
the reflector is a polyhedron prism, and the direction indicators are respectively formed on apexes of the polyhedron prism.

4. A surveying system for surveying a target device comprising:
a surveying instrument configured to collimate a reflector of the target device to survey a location of the reflector, the reflector comprising a bottom surface with sides;
a target imager oriented in a direction identical to a direction of collimation of the surveying instrument, the target imager being configured to take a target image including the reflector; and
an orientation detector configured to detect an orientation of the target device based on a direction indicator formed on each of the sides of the reflector to indicate a direction of the reflector appearing in the target image, wherein each of the direction indicators are distinguished from one another based on appearance.

5. The surveying system of claim 4, wherein
the target device is provided on a mobile object, and the orientation detector detects an orientation of the mobile object based on the orientation of the target device.

6. The surveying system of claim 5, wherein
the mobile object is a flight vehicle, and
the surveying system further includes:
a camera mounted on the flight vehicle to take an image for a photographic survey; and
a surveying controller configured to add information on the orientation of the mobile object detected by the orientation detector to a surveying result surveyed by the surveying instrument, and to associate the surveying result with the image taken by the camera to generate data for the photographic survey.

7. The surveying system of claim 4, wherein the bottom surface comprises four sides.

8. A target device to be surveyed, the device comprising:
a reflector configured to reflect light incident on the reflector in a direction identical to a direction of incidence of the light;
a support part configured to support the reflector; and
a plurality of direction indicators formed on the reflector or the support part to indicate a direction of the reflector, wherein
the direction indicators are distinguished from each other based on appearances of the direction indicators to indicate the direction of the reflector, and wherein the reflector is a polyhedron prism, and the direction indicators are respectively formed on apexes of the polyhedron prism.

\* \* \* \* \*